US012779482B2

(12) United States Patent
Brugman

(10) Patent No.: US 12,779,482 B2
(45) Date of Patent: Nov. 3, 2026

(54) POWDER FEED UNIT AND APPARATUS COMPRISING THE SAME

(71) Applicant: FRAMER HOLDING B.V., Alblasserdam (NL)

(72) Inventor: Jelmer Brugman, Vianen (NL)

(73) Assignee: FRAMER HOLDING B.V., Alblasserdam (NL)

( * ) Notice: Subject to any disclaimer, the term of this patent is extended or adjusted under 35 U.S.C. 154(b) by 296 days.

(21) Appl. No.: 18/699,956

(22) PCT Filed: Oct. 12, 2022

(86) PCT No.: PCT/NL2022/050584
§ 371 (c)(1),
(2) Date: Apr. 10, 2024

(87) PCT Pub. No.: WO2023/063824
PCT Pub. Date: Apr. 20, 2023

(65) Prior Publication Data

US 2024/0416371 A1 Dec. 19, 2024

(30) Foreign Application Priority Data

Oct. 14, 2021 (NL) ..................................... 2029426

(51) Int. Cl.
*B05B 7/14* (2006.01)

(52) U.S. Cl.
CPC ............ *B05B 7/1472* (2013.01); *B05B 7/144* (2013.01); *B05B 7/1463* (2013.01)

(58) Field of Classification Search
CPC ...... B05B 7/1472; B05B 7/144; B05B 7/1463
See application file for complete search history.

(56) References Cited

U.S. PATENT DOCUMENTS

| | | | | |
|---|---|---|---|---|
| 3,854,634 A * | 12/1974 | Hart | A01M 9/0092 33/721 |
| 5,116,321 A * | 5/1992 | Gelain | B05B 7/1472 222/64 |
| 7,273,075 B2 | 9/2007 | Tapphorn et al. | |
| 7,955,031 B2 * | 6/2011 | Powell | B65G 47/1421 406/75 |
| 9,765,436 B2 | 9/2017 | Kennedy et al. | |
| 2018/0065100 A1 | 3/2018 | Maev et al. | |

* cited by examiner

*Primary Examiner* — Jason K Niesz
(74) *Attorney, Agent, or Firm* — Hudak, Shunk & Farine Co. LPA

(57) ABSTRACT

A powder feed unit having a powder collection unit that includes a surface covering part and a powder collect-and-load part that allow a carrier gas to enter a powder collect-and-load cavity of the powder collect-and-load part via a first passageway, and powder particles to freely fall into said cavity via a second passageway. Upon entering said cavity, the powder particles are loaded onto the carrier gas thereby reducing and ideally avoiding contact between the powder particles and interior surfaces of said cavity. The carrier gas that is loaded with the powder particles can exit said cavity via a third passageway that is fluidly connected with a tubular conveyor element. An apparatus for performing laser welding processes or thermal spraying processes that includes the powder feed unit.

20 Claims, 6 Drawing Sheets

POWDER FEED UNIT AND APPARATUS COMPRISING THE SAME

FIELD OF THE INVENTION

The present invention relates to a powder feed unit for feeding at least one of metallic powder particles and ceramic powder particles of a powder stock to an apparatus for performing laser welding processes or thermal spraying processes. The invention further relates to the aforementioned apparatus comprising the powder feed unit.

BACKGROUND OF THE INVENTION

Known apparatuses for performing laser welding or thermal spraying processes involving at least one of metallic powder particles and ceramic powder particles have powder feed units comprising at least one so-called hopper containing a powder stock of a desired kind of powder particles, i.e. metallic particles, ceramic particles or any suitable blend thereof and a dosing system to provide powder particles collected from the hopper to said apparatuses. The known powder feed units comprise a relatively large number of parts such as discs provided with drop holes, discs provided with grooves, blade wheels, rotating brushes and vibratory tracks that are configured and arranged with respect to each other to collect powder particles from the powder stock in the hopper via an opening in the bottom of the hopper and dose it towards the apparatuses mentioned above. Some of the known powder feed units use relatively high overpressure control, e.g. 0.5 MPa to 0.8 MPa (5-8 bar), to collect and dose the powder particles.

As mentioned above, the known powder feed units comprise a relatively large number of parts that come into contact with the powder particles during collection and dosing thereof. Because of this, the risk of congestions and therefore interruptions in the collection and dosing of the powder is increased. This is disadvantageous for achieving a consistent powder flow. In addition, the large number of parts of the known powder feed units that come into contact with the powder particles is disadvantageous for manageability, wear and cleaning. In addition, many systems suffer from pulsations or they do not work well at low flow rates of carrier gas due to the nature of the dosing method used. In particular, a low flow rate of the carrier gas is desirable to limit or prevent turbulence in gas flows.

In view of the above-mentioned disadvantages regarding known powder feed units of known apparatuses for performing laser welding or thermal spraying processes involving at least one of metallic powder particles and ceramic powder particles, there is a need to provide a powder feed unit having a less complicated construction and an improved performance.

SUMMARY OF THE INVENTION

It is an object of the present invention to provide a powder feed unit for feeding at least one of metallic powder particles and ceramic powder particles of a powder stock to a laser welding or thermal spraying apparatus that pre-empts or at least reduces at least one of the above-mentioned and/or other disadvantages associated with powder feed units known in the art.

It is also an object of the present invention to provide an apparatus for performing laser welding or thermal spraying processes involving at least one of metallic powder particles and ceramic powder particles that comprises a powder feed unit according to the invention.

Aspects of the present invention are set out in the accompanying independent and dependent claims. Features from the dependent claims may be combined with features from the independent claim as appropriate and not merely as explicitly set out in the claims.

At least one of the above-mentioned objects is achieved by a powder feed unit for feeding powder particles to an apparatus for performing laser welding processes or thermal spraying processes, the powder feed unit comprising:

- a housing that is provided with an inlet port that is configured and arranged to allow influx of a carrier gas into the housing and an outlet port that is configured and arranged to allow outflux of the carrier gas out of the housing, the housing being configured to contain the carrier gas in use of the powder feed unit at a pressure that is higher than a pressure of an environment in which the housing is positioned;
- a container that is arranged within the housing, the container comprising a powder stock that comprises at least one of metallic powder particles and ceramic powder particles;
- a powder collection unit and an actuator that is configured and arranged to rotate the powder collection unit and the container with respect to each other, the powder collection unit comprising:
  - a surface covering part that in use of the powder feed unit is arranged in contact with a first surface of the powder stock, the surface covering part being configured and arranged to at least partially level-off the first surface and to provide a first passageway for the carrier gas to enter the powder collection unit; and.
  - a powder collect-and-load part that in use of the powder feed unit is arranged at least partially below the first surface of the powder stock, the powder collect-and-load part being provided with:
    - a powder collect-and-load cavity that is arranged in fluid communication with the first passageway for allowing the carrier gas to enter the powder collect-and-load cavity;
    - a second passageway that is configured and arranged to allow powder particles of the powder stock to enter the powder collect-and-load cavity upon activation of the actuator;
    - a wall portion that is configured and arranged to allow at least a portion of the powder particles of the powder stock upon passing through the second passageway to freely fall into the powder collect-and-load cavity and to be loaded onto the carrier gas;
    - a third passageway that is configured and arranged to allow the carrier gas that is loaded with at least said portion of the powder particles to exit the powder collect-and-load cavity; and
    - a tubular conveyor element that is arranged in fluid communication with the third passageway in the powder collect-and-load part of the powder collection unit and the outlet port of the housing, the tubular conveyor element providing a guideway that is configured and arranged to convey the carrier gas that is loaded with at least said portion of the powder particles from the powder collect-and-load cavity outside the housing via the outlet port.

Upon actuation of the actuator of the above-defined powder feed unit, the first surface of the powder stock in the container is at least partially leveled off by the surface covering part of the powder collection unit that is arranged on top of and in contact with the first surface of the powder stock. The powder particles from the powder stock can be collected in the powder collect-and-load cavity upon passing through the second passageway in the powder collect-and-load part. The person skilled in the art will appreciate that the powder collection unit can be provided with any suitable number of powder collect-and-load parts, e.g. 2, 3 or 4, that can be arranged with respect to each other at any suitable location, i.e. at any location where the multiple powder collect-and-load parts do not negatively influence each other.

Due to the simple construction of the powder feed unit according to the invention, the risk of congestions and therefore interruptions in collection and dosing of the powder particles can be decreased. This is advantageous for achieving a consistent powder flow, manageability, wear and cleaning of the powder feed unit according to the invention. For example, when a different kind of powder is desired, e.g. a metallic powder instead of a ceramic powder, exchange of the currently used container comprising the metallic powder can easily be done. After decommissioning the powder feed unit, the powder collection unit is removed from the currently used container. Next, the currently used container is replaced by a replacement container comprising the desired powder, e.g. ceramic powder. Then after cleaning the powder collection unit or after replacing it by a replacement powder collection unit, the powder collection unit or its replacement is placed in contact with the powder stock of the desired powder in the replacement container. Based on the above, the person skilled in the art will appreciate that cleaning of the powder feed unit is less laborious and therefore quicker as components such as discs provided with drop holes, discs provided with grooves, blade wheels, rotating brushes and vibratory tracks that are employed in powder feed units known in the art are not present in the powder feed unit according to the invention and therefore do not need to be cleaned. Hence the user experience of the powder feed unit according to the present invention is improved.

Furthermore, because of the absence of blade wheels and rotating brushes the powder feed unit according to the invention can reduce and ideally prevent pulsations during feeding of the powder particles to an apparatus for performing laser welding or thermal spraying processes that is connected to the powder feed unit. Moreover, contact between interior surfaces of the collect-and-load cavity and at least the portion of the powder particles that freely fall into the collect-and-load cavity via the second passageway in the collect-and-load part of the powder collection unit can be reduced and ideally be prevented because at least said portion of the powder particles can be picked up smoothly by the carrier gas that flows through the collect-and-load cavity. In this way, ideally contact-free loading of the carrier gas with at least said portion of the powder particles can occur. As a result, pulsations during the feeding or dosing of the powder particles to an apparatus for performing laser welding or thermal spraying processes can be reduced and ideally be prevented. The person skilled in the art will appreciate that the performance of the apparatus for performing laser welding or thermal spraying processes can be improved due to the pulsation-free feeding or dosing of the powder particles by the powder feed unit according to the present invention.

Due to the overpressure at which the carrier gas can be contained in the housing during operation of the powder feed unit relative to the pressure of the environment in which the housing is positioned, e.g. atmospheric pressure, the carrier gas that is loaded with at least said portion of the powder particles can flow out of the collect-and-load cavity and out of the housing via the guideway that is provided by the tubular conveyor element, e.g. a hose, that is arranged in fluid communication with the third passageway in the powder collect-and-load part of the powder collection unit and the outlet port of the housing of the powder feed unit. The pressure of the carrier gas in the housing can be higher than the pressure of the environment in which the housing is positioned by a percentage that can be in a range from 150% to 1000%. This means that if the pressure of the environment in which the housing is positioned is 0.1 MPa (1 bar), the pressure of the carrier gas in the housing can be in a range from 0.15 MPa (1.5 bar) to 1.0 MPa (10 bar). Preferably, the percentage by which the pressure of the carrier gas in the housing is higher than the pressure of the environment in which the housing is positioned can be in a range from 250% to 850%. This means that if the pressure of the environment in which the housing is positioned is 0.1 MPa (1 bar), the pressure of the carrier gas in the housing can be in a range from 0.25 MPa (2.5 bar) to 0.85 MPa (8.5 bar).

The person skilled in the art will appreciate that the carrier gas can be an inert gas, i.e. a gas that has a very low chemical reactivity. The person skilled in the art will appreciate that for example nitrogen or any suitable noble gas such as argon can be used as inert gas in the powder feed unit according to the present invention.

In an exemplary embodiment of the powder feed unit according to the invention, the housing can be provided with at least one wall mounting element. This improves user friendliness of the powder feed unit as it can for example be mounted on a wall close to an apparatus for performing laser welding or thermal spraying processes. The person skilled in the art will appreciate that suitable wall mounting elements include for example latches, clamps, catches, locks, hooks, pins, nails, screws, bolts and nuts, chains and any combination thereof.

In another exemplary embodiment of the powder feed unit according to the invention, the powder feed unit can comprise a positioning element that can be arranged in contact with the powder collection unit and the housing and configured to slide relative to the housing to position the surface covering part of the powder collection unit on top of and in contact with the first surface of the powder stock in the container and to prevent rotation of the powder collection unit with respect to the container. In this way, stable positioning of the surface covering part of the powder collection unit on top of the first surface of the powder stock can be established. The positioning element can be configured and arranged to remain in contact with the housing and the powder collection unit while the powder level of the powder stock in the container decreases during operation of the powder feed unit. The positioning element can be a tubular element or a rod having a cross-section that allows the positioning element to slide relative to the housing and prevents rotation of the positioning element relative to at least one of the housing and the container that is positioned on the rotatable supporting element. In order to achieve this, the cross-section of the positioning element can have any suitable polygonal shape, e.g. square or hexagonal.

In an embodiment of the powder feed unit according to the invention, the first passageway is configured and arranged to allow acceleration of the carrier gas upon passing of the carrier gas through the first passageway.

By allowing acceleration of the carrier gas not earlier than upon passing the first passageway that is arranged in fluid communication with the powder collect-and-load cavity, it can be avoided that whirls in the carrier gas flow outside the powder collect-and-load cavity can give rise to powder particles ending up on top of the powder collection unit. As a result, the performance of the powder feed unit according to the invention can be improved compared to powder feed units known in the art.

In an exemplary embodiment of the powder feed unit according to the invention, the guideway of the tubular conveyor element has a first cross-section and the first passageway provided by the surface covering part of the powder collection unit has a second cross-section, the first cross-section being smaller than or equal to the second cross-section. In this way, acceleration of the carrier gas in the collect-and-load cavity can be maintained and a smooth and efficient loading of the carrier gas with at least the portion of the powder particles that freely fall into the collect-and-load cavity via the second passageway in the collect-and-load part of the powder collection unit can be achieved. As a result, contact between at least a majority of the powder particles that are loaded onto the carrier gas and internal surfaces of the powder collect-and-load cavity can be reduced and ideally be avoided. The same holds for any contact between interior surfaces of the guideway through which the carrier gas that is loaded with at least said portion of the powder particles can be transported out of the powder collect-and-load cavity and the housing of the powder feed unit.

In an embodiment of the powder feed unit according to the invention, the surface covering part of the powder collection unit comprises a first surface part that in use of the powder feed unit is arranged in contact with the first surface of the powder stock, a second surface part that is arranged recessed with respect to the first surface part and adjacent to the second passageway in the powder collect-and-load part, and wherein in use of the powder feed unit the second surface part is arranged facing towards the first surface of the powder stock, and a third surface part that is arranged adjacent to both the second passageway and the second surface part, the third surface part being arranged at an angle $\alpha$ with respect to the second surface part, the angle $\alpha$ being in a range $0° \leq \alpha \leq 75°$, preferably the angle $\alpha$ is in a range $15° \leq \alpha \leq 60°$.

The first surface part of the surface covering part of the powder collection unit can remain in contact with the first surface of the powder stock because the powder collection unit moves under the influence of gravity towards the bottom of the container when the powder level of the powder stock in the container decreases. Due to the movement of the powder collection unit and the container with respect to each other, the first surface part of the surface covering part can at least partially level-off the powder particles and provide a level first surface of the powder stock. While the first surface of the powder stock is being leveled-off, a bow wave of powder particles can be created at the third surface part of the surface covering part. The second surface part of the surface covering part of the powder collection unit is arranged recessed with respect to the first surface part in order to provide a volume that can accommodate powder particles of the bow wave of powder particles in such a way that the second passageway in the powder collect-and-load part of the powder collection unit that is arranged adjacent to the second surface part can remain fully immersed in the powder particles that need to be supplied to an apparatus for performing laser welding or thermal spraying processes that is connected with the powder feed unit according to the invention. In this way, it can be assured that no interruptions during collection and loading of the powder particles in the powder collect-and-load part can occur. As a result, pulsations during the feeding or dosing of the powder particles to an apparatus for performing laser welding or thermal spraying processes can be reduced and ideally be prevented.

In an embodiment of the powder feed unit according to the invention, a height difference, Dh, between the second surface part and the first surface part is in a range $0.5\ \text{mm} \leq Dh \leq 2.5\ \text{mm}$, preferably Dh is in a range $0.7\ \text{mm} \leq Dh \leq 2.0\ \text{mm}$.

The second surface part should be able to provide a volume that can accommodate the powder particles that are pushed towards the second surface part and the second passageway in the powder collect-and-load part if the first surface of the powder stock is being levelled-off by the first surface part of the surface covering part of the powder collection unit. If the height difference between the second surface part and the first surface part of the surface covering part is smaller than 0.5 mm, it is possible that the above-mentioned volume cannot be sufficiently filled with powder particles that during levelling-off of the first surface of the powder stock are pushed towards the second surface part of the surface covering part. In this case, the supply of powder particles towards the second passageway in the powder collect-and-load part of the powder collection unit can be interrupted. As mentioned above, this can cause pulsations in the collection and loading of the powder particles and therefore result in a reduced performance of the powder collection unit and a reduced performance of the powder feed unit as a whole. If the height difference between the second surface part and the first surface part of the surface covering part is larger than 2.5 mm, it is possible that the bow wave of powder particles cannot sufficiently be formed at the third surface part of the surface covering part. In this case, it is possible that it cannot be guaranteed that the second passageway in the powder collect-and-load part remains fully immersed in the powder particles. As a result, it cannot be guaranteed that the collection and loading of the powder particles remains pulsation free and therefore the performance of the powder feed unit as a whole can get compromised.

In an embodiment of the powder feed unit according to the invention, the second passageway in the powder collect-and-load part of the powder collection unit has one of a wedge-shape, a rectangular shape, and a curved shape.

Depending on specific requirements with respect to for example flow rates of the carrier gas that is loaded with at least the above-mentioned portion of the powder particles, any one of the above-mentioned shapes for the second passageway in the powder collect-and-load part can be chosen as long as the second passageway allows at least a majority of the powder particles from the powder stock to freely fall into the powder collect-and-load cavity.

In an embodiment of the powder feed unit according to the invention, the wall portion has a flat shape and is arranged at an angle $\beta$ with respect to a normal vector of the second surface part of the surface covering part of the powder collection unit, the angle $\beta$ being in a range $-45° \leq \beta \leq +30°$, preferably the angle $\beta$ is in a range $-30° \leq \beta \leq +15°$, most preferably the angle $\beta$ is equal to 0°.

In the event that the flat wall portion is arranged at an angle $\beta$ that is in a range $-45° \leq \beta \leq 0°$ with respect to the second surface part of the surface covering part, the majority of particles from the powder stock can freely fall into the powder collect-and-load cavity if the powder collection unit and the container are rotated with respect to each other by the actuator. For an angle β that is for example in a range −75°≤β≤−45° the powder collect-and-load cavity becomes unnecessarily large. Therefore, in order to achieve a powder collect-and-load part with minimum dimensions that still allows the majority of particles from the powder stock to freely fall into the powder collect-and-load cavity, an angle β of 0° is preferred.

For an angle β in a range 0°<β≤+30°, the wall portion provides a ramp or a slide for the powder particles that enter through the second passageway in the powder collect-and-load part. Although the majority of particles from the powder stock cannot freely fall into the powder collect-and-load cavity, the loading of the carrier gas with the powder particles can still be done without excessive interaction between the powder particles, the wall portion and/or other interior walls of the powder collect-and-load cavity. Although it may no longer be possible to achieve pulsation-free feeding of powder particles, pulsations in the feeding of powder particles by the powder feed unit according to the present invention can be reduced compared to powder feed units known in the art. For an angle β>+30°, the interactions between the powder particles, the wall portion and/or other interior walls of the powder collect-and-load cavity are too large to achieve even reduced pulsations in the feeding of powder particles by the powder feed unit according to the present invention.

In an embodiment of the powder feed unit according to the invention, the wall portion has a curved shape. Depending on the specific requirements for the powder feed unit to be used with an apparatus for performing laser welding or thermal spraying processes, the wall portion can have any curved shape that is suitable for smoothly and efficiently loading the carrier gas with powder particles from the powder stock in the powder collect-and-load cavity of the powder collection unit.

In an embodiment of the powder feed unit according to the invention, the wall portion at the second passageway has a thickness, t, that is in a range 0.05 mm≤t≤0.5 mm, preferably the thickness, t, is in a range 0.1 mm≤t≤0.4 mm.

In this way, friction between the powder particles and the wall portion at the second passageway can be reduced and ideally be minimized when the powder particles enter the powder collect-and-load cavity via the second passageway. This is beneficial for achieving pulsation-free feeding of powder particles by the powder feed unit according to the present invention to an apparatus for performing laser welding or thermal spraying processes.

In an embodiment of the powder feed unit according to the invention, the actuator is configured and arranged to rotate at a predetermined rotation speed the container with respect to the powder collection unit or the powder collection unit with respect to the container.

In the event that the actuator rotates the container with respect to the powder collection unit, the powder collection unit is stationary arranged, i.e. non-rotating with respect to the rotatable container. An advantage of this embodiment is that no dynamic sealing means are required for maintaining the overpressure at which the carrier gas is contained within the housing. The actuator can be any suitable actuator that is positioned completely inside the housing, is part of the housing or is arranged partially inside and partially outside of the housing. In particular regarding the latter, the person skilled in the art will appreciate that care should be taken to provide appropriate sealing of the part of the actuator that passes through the wall of the housing in order to maintain the above-mentioned overpressure of the carrier gas inside the housing during operation of the powder feed unit.

The person skilled in the art will appreciate that the embodiment of the powder feed unit in which the actuator rotates the powder collection unit with respect to the container is more complicated because dynamic sealing arrangements are required for maintaining the overpressure at which the carrier gas is contained within the housing during operation of the powder feed unit instead of the passive sealing arrangements that suffice when the powder collection unit remains stationary and the container is rotated with respect to the powder collection unit. The actuator that is configured and arranged to rotate the powder collection unit relative to the stationary arranged container can be any suitable actuator that is positioned completely inside the housing, completely outside of the housing or partially inside and partially outside of the housing. Regarding the last two options, the person skilled in the art will appreciate that care should be taken to provide appropriate sealing of a part of the actuator or of a part of the powder collection unit that passes through the wall of the housing in order to maintain the above-mentioned overpressure of the carrier gas inside the housing during operation of the powder feed unit.

It is noted that the actuator can be any suitable mechanism that is configured and arranged to rotate the container and the powder collection unit with respect to each other at a predetermined rotation speed, i.e. rotate the container with respect to a stationary arranged, i.e. non-rotating powder collection unit, rotate the powder collection unit with respect to a stationary arranged container, or rotate both the container and the powder collection unit with respect to each other. The powder collection rate at which powder particles are collected from the powder stock by the powder collection unit depends on the predetermined rotation speed. Therefore, the dosage of powder can be controlled by controlling the predetermined rotation speed. In the case that both the container and the powder collection unit are rotated the powder collection rate depends on a relative rotation speed resulting from the respective predetermined rotation speeds of the container and the powder collection unit.

The person skilled in the art will appreciate that the predetermined rotation speed can be variable. As mentioned above, the predetermined rotation speed determines the powder flow. Therefore, by being able to vary the rotation speed, a variable powder flow can be established. Furthermore, because of the absence of blade wheels and rotating brushes that can cause pulsations in the powder flow of powder feed units comprised in the state of the art, the powder feed unit according to the invention allows for a stepless dosage of powder particles to an apparatus for performing laser welding or thermal spraying processes.

In an embodiment of the powder feed unit according to the invention, the actuator is a rotatable supporting element that is arranged inside the housing to support and rotate the container with respect to the powder collection unit at a predetermined rotation speed.

The rotatable supporting element can be a rotatable disc on which the container is positioned. A grip enhancing intermediate element can be positioned between the rotatable supporting element and the container to prevent slip of the container with respect to the rotatable supporting element during rotation thereof. The grip enhancing intermediate element can comprise any material that is suitable for preventing slip of the container such as rubber or a polymer. Furthermore, the grip enhancing intermediate element can have any suitable form, e.g. a sheet or a film. The container can comprise any kind of material or combination of materials, e.g. glass, polymer, or fiber containing material, that is suitable for containing metallic powder particles, ceramic powder particles or any combination thereof.

In an embodiment of the powder feed unit according to the invention, the powder feed unit comprises a level sensor that is configured and arranged to determine a powder level of the powder stock in the container and to provide a signal indicative for the determined powder level of the powder stock in the container to a control unit that is configured to determine based on the signal received from the level sensor whether the powder level of the powder stock in the container is equal to a predetermined minimum powder level.

In this way, it can be checked before starting of a laser welding or thermal spraying process if there is still enough powder in the container of the powder feed unit. If the powder level of the stock of powder in the container is above the predetermined minimum powder level, the laser welding or thermal spraying process can be started. If the powder level of the stock of powder is equal to or less than the predetermined minimum powder level, then the control unit can provide a signal or message that the container needs to be replenished or changed. The level sensor can be any suitable sensor such as a camera that enables easy optical detection of the powder level of the powder stock in the container.

In an embodiment of the powder feed unit according to the invention, the powder feed unit comprises a load cell that is configured and arranged to determine a mass of the container and to provide a signal indicative for the determined mass of the container to a control unit that is configured to determine based on the signal received from the load cell whether the mass of the container is equal to a predetermined minimum mass.

In this way, it can be determined before starting of a welding or spraying process if there is still enough powder in the container. If the mass of the container is above the predetermined minimum mass, the laser welding or thermal spraying process can be started. If the mass of the container is equal to or less than the predetermined minimum mass, then the control unit can provide a signal or message that the container needs to be replenished or changed. The load cell can be of any suitable type such as a hydraulic load cell, a piezoelectric load cell, a pneumatic load cell, a capacitive load cell or a strain gauge load cell. The person skilled in the art will know how to configure and arrange the load cell to obtain a reliable signal or message from the control unit.

The person skilled in the art will appreciate that the container can be an exchangeable container. If for example a first kind of metallic powder is contained in a first exchangeable container and a second kind of metallic powder is contained in a second exchangeable container, an easy change from the first kind of metallic powder to the second kind of metallic powder can be made. The exchangeable container can be a cartridge comprising a powder stock of a desired powder type. If required, the cartridge that is being used can be replaced by another cartridge comprising a powder stock of the same powder type of the same or another kind, or by another cartridge comprising a powder stock of another powder type of a desired kind. The previously used cartridge can be stored for later use. Storage of the cartridge can involve providing the cartridge with a lid to prevent contamination or spillage of the powder stock contained in the cartridge. The person skilled in the art will appreciate that the exchangeable container can also be the packaging, for example the jar, the can, the bottle, in which the powder stock of the desired powder type is being sold.

In an embodiment of the powder feed unit according to the invention, the powder feed unit comprises a flow rate controller that is configured and arranged to control a flow rate, Q, of the carrier gas flowing into the housing via the inlet port and out of the housing via the outlet port. The person skilled in the art will appreciate that in this way the dosage of the powder particles to an apparatus for performing laser welding or thermal processes can be controlled.

In an embodiment of the powder feed unit according to the invention, the flow rate controller is configured and arranged to control the flow rate, Q, of the carrier gas in a range $0.5 l/min \leq Q \leq 10 l/min$, preferably in a range $1.5 l/min \leq Q \leq 8.5 l/min$. In this way, the powder feed unit according to the invention allows application of low flow rates of carrier gas which in particular is desirable to limit or prevent turbulence in the carrier gas flow.

According to another aspect of the present invention, an apparatus for performing laser welding processes or thermal spraying processes involving at least one of metallic powder and ceramic powder, said apparatus comprising a powder feed unit according to the invention. By using a powder feed unit according to the invention, the apparatus can achieve an improved homogeneity of the laser welding processes or thermal spraying processes carried out therewith.

BRIEF DESCRIPTION OF THE DRAWINGS

Further features and advantages of the invention will become apparent from the description of the invention by way of exemplary and non-limiting embodiments of a powder feed unit and an apparatus comprising the powder feed unit according to the invention.

The person skilled in the art will appreciate that the described embodiments of the powder feed unit and the apparatus comprising the powder feed unit are exemplary in nature only and not to be construed as limiting the scope of protection in any way. The person skilled in the art will realize that alternatives and equivalent embodiments of the powder feed unit and the apparatus comprising the powder feed unit can be conceived and reduced to practice without departing from the scope of protection of the present invention.

Reference will be made to the figures on the accompanying drawing sheets. The figures are schematic in nature and therefore not necessarily drawn to scale. Furthermore, equal reference numerals denote equal or similar parts. On the attached drawing sheets.

DETAILED DESCRIPTION OF EMBODIMENTS

Figure 1:
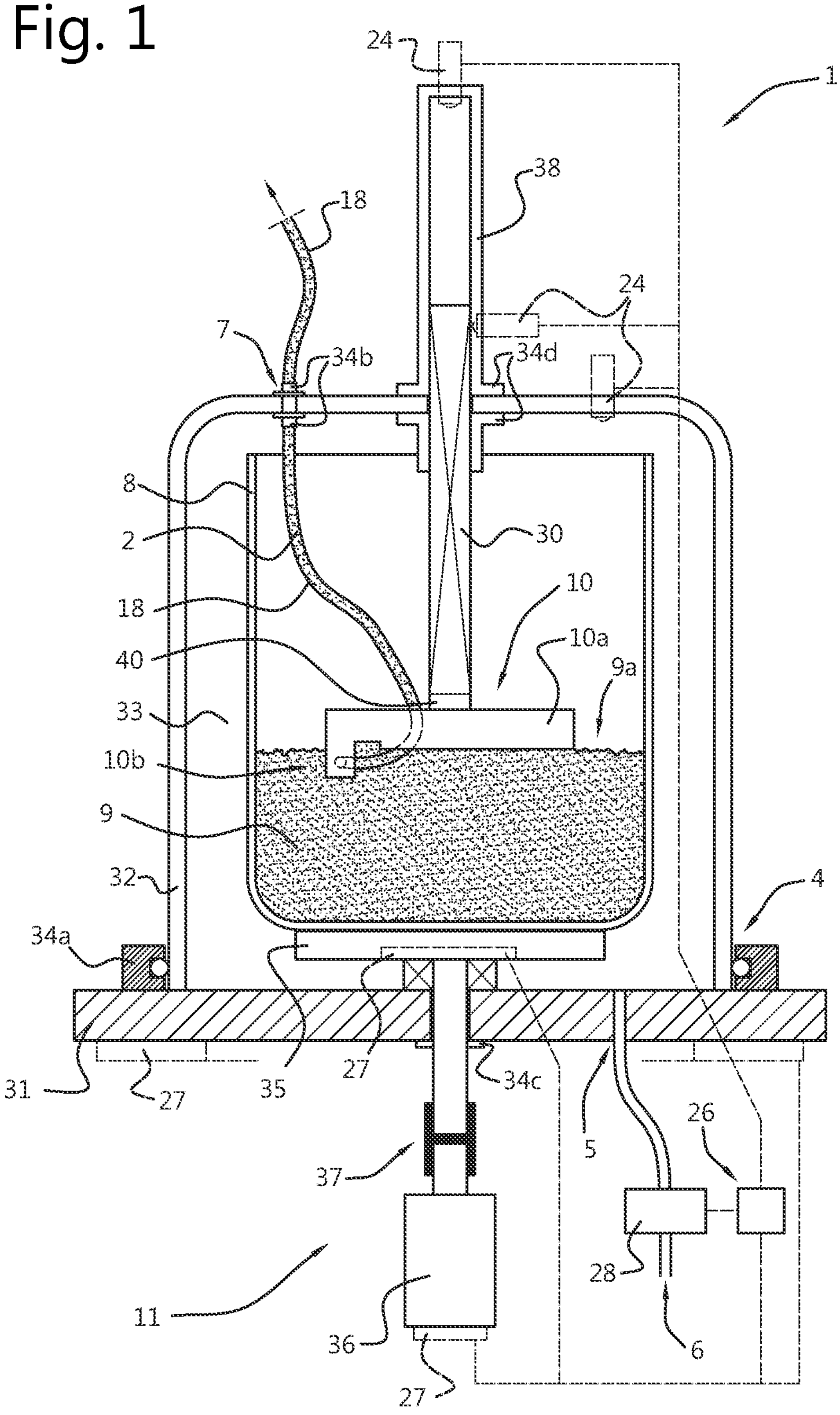
FIG. 1 shows a schematic cross-sectional view of an exemplary, non-limiting embodiment of a powder feed unit according to the invention.
Figure 6:
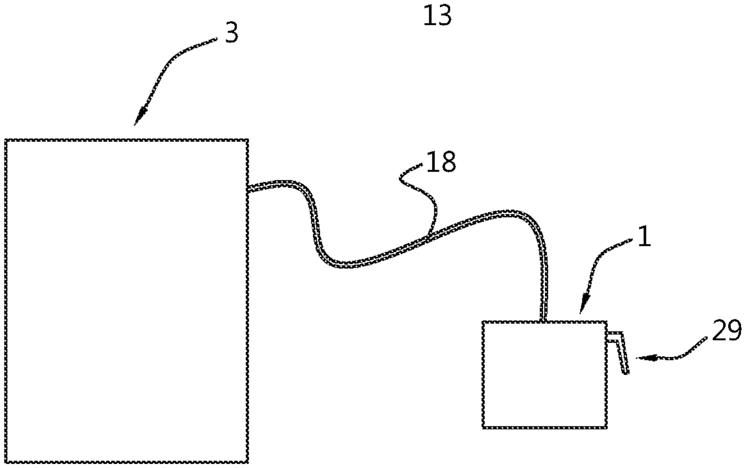
FIG. 6 shows a schematic layout of an exemplary, non-limiting embodiment of an apparatus for performing laser welding or thermal spraying processes according to the invention that comprises a powder feed unit according to the invention.

FIG. 1 shows a schematic cross-sectional view of an exemplary, non-limiting embodiment of a powder feed unit 1 according to the invention. The powder feed unit 1 comprises a housing 4 that comprises a base part 31 on top of which a hood 32 is positioned to provide an inner space 33. The powder feed unit 1 further comprises a sealing element 34*a* that is arranged to enable a fluid tight connection between the hood 32 and the base part 31 during operation of the powder feed unit 1. The base part 31 is provided with an inlet port 5 that is configured and arranged to allow influx of a carrier gas 6 into the inner space 33 of the housing 4 during operation of the powder feed unit 1. In the exemplary embodiment shown in FIG. 1, the hood of the housing 4 comprises an outlet port 7 that is configured and arranged to allow outflux of the carrier gas 6 out of the housing 4 via a tubular conveyor element 18, e.g. a hose, that can be connected with a laser welding or thermal spraying apparatus 3 as is schematically shown in FIG. 6. The sealing arrangements 34*a*, 34*b*, 34*c*, 34*d* are configured and arranged to contain the carrier gas 6 during operation of the powder feed unit 1 inside the housing 4 at a pressure that is higher than a pressure of an environment in which the housing 4 is positioned in order to create an overpressure in the housing 4 compared to the pressure of the environment in which the housing 4 is positioned. The pressure of the carrier gas 6 in the housing 4 can be higher than the pressure of the environment in which the housing 4 is positioned by a percentage that can be in a range from 150% to 1000%. This means that if the pressure of the environment in which the housing 4 is positioned is 0.1 MPa (1 bar), the pressure of the carrier gas 6 in the housing 4 can be in a range from 0.15 MPa (1.5 bar) to 1.0 MPa (10 bar). Preferably, the percentage by which the pressure of the carrier gas 6 in the housing 4 is higher than the pressure of the environment in which the housing 4 is positioned can be in a range from 250% to 850%. This means that if the pressure of the environment in which the housing 4 is positioned is 0.1 MPa (1 bar), the pressure of the carrier gas 6 in the housing 4 can be in a range from 0.25 MPa (2.5 bar) to 0.85 MPa (8.5 bar).

The carrier gas 6 preferably is an inert gas, i.e. a gas that has a low chemical reactivity. The person skilled in the art will appreciate that for example nitrogen or any suitable noble gas such as argon can be used as inert gas in the powder feed unit 1.

The powder feed unit 1 shown in FIG. 1 further comprises a container 8 that is arranged in the inner space 33 of the housing 4. The container 8 comprises a powder stock 9 of powder particles 2 that are at least one of metallic powder particles, ceramic powder particles or any suitable blend thereof. Upon actuation of an actuator 11, a first area of a first surface 9*a* of the powder stock 9 is leveled-off by a surface covering part 10*a* of a powder collection unit 10. The surface covering part 10*a* is arranged on top of and in contact with the first surface 9*a* of the powder stock 9. The powder particles 2 from the powder stock 9 can be collected in a powder collect-and-load cavity 13 of a powder collect-and-load part 10*b* of the powder collection unit 10 upon passing through a second passageway 14 in the powder collect-and-load part 10*b*. The person skilled in the art will appreciate that the surface covering part 10*a* of the powder collection unit 10 can be associate with any suitable number of powder collect-and-load parts, e.g. 2, 3 or 4, that can be arranged with respect to each other at any suitable location, i.e. at any location where the multiple powder collect-and-load parts do not negatively influence each other.

The actuator 11 of the powder feed unit 1 comprises a supporting element 35, e.g. a disc, that is connected to a motor 36, e.g. an electromotor, via a transmission arrangement 37. In the embodiment of the powder feed unit 1 shown in FIG. 1, the actuator 11 is arranged partially inside and partially outside the housing 4, i.e. the supporting element 35 is arranged in the inner space 33 of the housing 4, the motor 36 is arranged outside the housing 4, and the transmission arrangement 37 is arranged to pass through the wall of the base part 31. The person skilled in the art will appreciate that appropriate sealing is required regarding the part of the transmission arrangement 37 that passes through the wall of the base part 31 in order to maintain the above-mentioned overpressure of the carrier gas 6 inside the housing 4 during operation of the powder feed unit 1. The person skilled in the art will appreciate that different embodiments of the actuator 11 fall within the inventive concept of the present invention. The actuator 11 can be any suitable actuator that for example is positioned completely inside the housing 4 or is part of the housing 4, e.g. the base part 31 could be configured to be rotatable with respect to the hood 32.

In the embodiment of the powder feed unit 1 shown in FIG. 1, the actuator 11 is configured to rotate the supporting element 35 and thereby the container 8 that is positioned on the supporting element 35. In this way, the container 8 is rotatable with respect to the powder collection unit 10 at a predetermined rotation speed to enable collection of powder particles 2 from the powder stock 9 by the powder collection unit 10 at a powder collection rate that depends on the predetermined rotation speed.

It is noted that the rotatable supporting element 35 on which the container 8 is positioned can have a disc shape or any other suitable shape. Furthermore, a grip enhancing intermediate element (not shown in FIG. 1) can be positioned between the rotatable supporting element 35 and the container 8 to prevent slip of the container 8 with respect to the rotatable supporting element 35 during rotation thereof. The grip enhancing intermediate element can comprise any material that is suitable for preventing slip of the container 8 such as rubber or a polymer. Furthermore, the grip enhancing intermediate element can have any suitable form, e.g. a sheet or a film. The container 8 can comprise any kind of material or combination of materials, e.g. glass, polymer, or fiber containing material, that is suitable for containing metallic powder particles, ceramic powder particles or any combination thereof. In addition, in accordance with another exemplary embodiment of the powder feed unit 1 of the present invention, the container 8 can also be mounted on the rotatable supporting element 35 using an attachment arrangement. Any suitable attachment arrangement known in the art can be envisaged to connect the container 8 with the rotatable supporting element 35.

Due to the simple construction of the powder feed unit 1 shown in FIG. 1, the risk of congestions and therefore interruptions in collection and dosing of the powder particles 2 can be decreased. This is advantageous for achieving a consistent powder flow, manageability, wear and cleaning of the powder feed unit 1. For example, if a different kind of powder is desired, e.g. a metallic powder instead of a ceramic powder, it is advantageous that the container 8 is an exchangeable container. The person skilled in the art will appreciate that if for example a first kind of metallic powder is contained in a first exchangeable container and a second kind of metallic powder is contained in a second exchangeable container, an easy change from the first kind of metallic powder to the second kind of metallic powder can be made. The exchangeable container can be a cartridge comprising a powder stock of a desired powder type. If required, the cartridge that is being used can be replaced by another cartridge comprising a powder stock of the same powder type of the same or another kind, or by another cartridge comprising a powder stock of another powder type of a desired kind. The previously used cartridge can be stored for later use. Storage of the cartridge can involve providing the cartridge with a lid to prevent contamination or spillage of the powder stock contained in the cartridge. The person skilled in the art will appreciate that the exchangeable container can also be the packaging, for example the jar, the can, the bottle, in which the powder stock of the desired powder type is being sold.

The person skilled in the art will appreciate that after decommissioning the powder feed unit 1, the powder collection unit 10 can be removed from the currently used container 8. Next, the currently used container 8 can be replaced by a replacement container (not shown) comprising the desired powder stock comprising for example ceramic powder particles. After cleaning the powder collection unit 10 or after replacing it by a replacement powder collection unit (not shown), the powder collection unit 10 or its replacement can be placed in contact with the powder stock of the desired powder in the replacement container. Based on the above, the person skilled in the art will appreciate that cleaning of the powder feed unit 1 is less laborious and therefore quicker because components such as discs provided with drop holes, discs provided with grooves, blade wheels, rotating brushes and vibratory tracks that are employed in powder feed units known in the art are not present in the powder feed unit 1 according to the invention and therefore do not need to be cleaned. Hence, the user experience of the powder feed unit 1 is improved.

Furthermore, because of the absence of blade wheels and rotating brushes, the powder feed unit 1 shown in FIG. 1 can reduce and ideally prevent pulsations during feeding of the powder particles 2 to an apparatus 3 for performing laser welding or thermal spraying processes that is connected to the powder feed unit 1. This is schematically shown in FIG. 6. Moreover, contact between interior surfaces of the collect-and-load cavity 13 and at least a portion of the powder particles 2 that freely fall into the collect-and-load cavity 13 via the second passageway 15 in the collect-and-load part 10*b* of the powder collection unit 10 can be reduced and ideally be prevented because at least said portion of the powder particles 2 can be picked up smoothly by the carrier gas 6 that flows through the collect-and-load cavity 13. In this way, ideally contact-free loading of the carrier gas 6 with at least said portion of the powder particles 2 can occur. As a result, pulsations during the feeding or dosing of the powder particles 2 to the apparatus 3 (shown in FIG. 6) for performing laser welding or thermal spraying processes can be reduced and ideally be prevented. The person skilled in the art will appreciate that the performance of the apparatus 3 for performing laser welding or thermal spraying processes can be improved due to the pulsation-free feeding or dosing of the powder particles 2 by the powder feed unit 1.

Furthermore, the person skilled in the art will appreciate that an advantage of the embodiment of the powder feed unit 1 shown in FIG. 1 is that no dynamic sealing means are required for maintaining the overpressure at which the carrier gas 6 is contained within the housing 4.

In accordance with another exemplary embodiment of the powder feed unit 1 (not shown), the actuator could be configured and arranged to rotate the powder collection unit with respect to the container at the predetermined rotation speed. The person skilled in the art will appreciate that this embodiment is more complicated as dynamic sealing arrangements would be required for maintaining the overpressure at which the carrier gas is contained within the housing during operation of the powder feed unit instead of the passive sealing arrangements 34*a*, 34*b*, 34*c*, 34*d* of the embodiment of the powder feed unit 1 shown in FIG. 1 that suffice when the powder collection unit 10 remains stationary and the container 8 is rotated with respect to the powder collection unit 10. The actuator in accordance with the not shown embodiment of the powder feed unit in which the powder collection unit would be rotatable relative to the stationary arranged container could be any suitable actuator that could be positioned completely inside the housing, completely outside the housing or partially inside and partially outside the housing. Regarding the last two options, the person skilled in the art will appreciate that care would have to be taken to provide appropriate sealing of a part of the actuator or of a part of the powder collection unit that passes through the wall of the housing in order to maintain the above-mentioned overpressure of the carrier gas inside the housing during operation of the powder feed unit. It is noted that the not shown embodiment of the powder feed unit described above in fact is a mechanical inversion of the embodiment of the powder feed unit 1 shown in FIG. 1. Hence, the person skilled in the art will appreciate that this mechanical inversion in any conceivable form will also fall within the scope of the present invention.

The powder collection rate at which the powder particles 2 can be collected in the powder collect-and-load cavity 13 of the powder collection unit 10 depends on a rotation speed at which the container 8 and the stationary powder collection unit 10 are rotated with respect to each other. Therefore, the dosage of powder particles 2 can be controlled by controlling the rotation speed. Furthermore, by being able to vary the rotation speed, a variable powder flow can be established. Because of the absence of blade wheels and rotating brushes that can cause pulsations in the powder flow of powder feed units comprised in the state of the art, the powder feed unit 1 shown in FIG. 1 allows for a stepless dosage of powder particles to an apparatus for performing laser welding or thermal spraying processes.

FIG. 1 schematically shows the pressurized carrier gas 6 that during operation of the powder feed unit 1 is loaded with at least the above-mentioned portion of the powder particles 2 in the powder collect-and-load cavity 13 of the powder collection unit 10. The pressurized gas 6 and at least said portion of the powder particles 2 flow together into the guideway 19 provided by the tubular conveyor element 18 via the third passageway 17 in the powder collect-and-load part 10*b* of the powder collection unit 10 due to the overpressure at which the carrier gas 6 is contained in the housing 4 relative to a pressure of the environment in which the housing 4 is positioned. The person skilled in the art will appreciate that in the embodiment of the powder feed unit 1 shown in FIG. 1, the only route for the carrier gas 6 and at least said portion of the powder particles 2 to flow out of the housing 4 is via the guideway 19 provided by the tubular conveyor element 18.

As mentioned above, in accordance with the embodiment of the powder feed unit 1 shown in FIG. 1, the powder collection unit 10 is arranged to be stationary, i.e. not rotatable. This is achieved by providing a positioning element 30 that is arranged in contact with the powder collection unit 10 and the hood 32 of the housing 4. The positioning element 30 is arranged in a sliding tube 38 and configured to slide relative to the hood 32 of the housing 4 to position the surface covering part 10*a* of the powder collection unit 10 in contact with the first surface 9*a* of the powder stock 9 in the container 8 and to prevent rotation of the powder collection unit 10 with respect to at least one of the housing 4 and the container 8. The sliding tube 38 is provided with sealing arrangement 34*d* to maintain the overpressure at which the carrier gas 6 is contained within the housing 4 during operation of the powder feed unit 1. The positioning element 30 is configured and arranged to remain in contact with the hood 32 of the housing 4 and the powder collection unit 10 when the powder level 25 of the powder stock 9 in the container decreases during operation of the powder feed unit 1. The positioning element 30 can be a tubular element or a rod having a cross-section that allows the positioning element 30 to slide relative to the hood 32 of the housing 4 and prevents rotation of the positioning element 30 relative to at least one of the hood 32 of the housing 4 and the container 8 that is positioned on the rotatable supporting element 35. In order to achieve this, the cross-section of the positioning element 30 can be square or have any other suitable polygonal shape.

The powder feed unit 1 shown in FIG. 1 also comprises a level sensor 24 that is attached to the hood 32 of the housing 4 at a location above the container 8. The person skilled in the art will appreciate that there are several positions were the level sensor 24 can be arranged depending on the specific design of the powder feed unit 1. Possible alternative positions at which the level sensor 24 can be arranged have been indicated by depicting the level sensor 24 with dashed lines. The person skilled in the art will appreciate that also more than one level sensor 24 can be used, e.g. two, three or four depending on the specific specifications of the powder feed unit 1.

As shown in FIG. 1, the level sensor 24 in any event is operatively connected to a control unit 26 that preferably is arranged outside the housing 4. The person skilled in the art will appreciate that the level sensor 24 can be connected to the control unit 26 in any suitable way, e.g. via a wired connection as schematically shown in FIG. 1 or via a wireless connection (not shown). The level sensor 24 is configured to determine a powder level 25 of the powder stock 9 in the container 8 and to provide a signal indicative for the determined powder level 25 to the control unit 26. The control unit 26 is configured to determine based on the signal received from the level sensor 24 if the powder level 25 of the powder stock 9 in the container 8 is equal to a predetermined minimum powder level. The person skilled in the art will appreciate that in this way it can be checked before starting of a welding or spraying process if there is still enough powder in the container 8 of the powder feed unit 1. If the powder level 25 of the powder stock 9 in the container 8 is above the predetermined minimum powder level, the welding or spraying process can be started. If the powder level 25 of the powder stock 9 is equal to or less than the predetermined minimum powder level, then the control unit 26 can provide a signal or message that the container 8 needs to be replenished or changed. The level sensor 24 can be any suitable sensor, e.g. a sonar detector or a camera that enables easy optical detection of the powder level 25 of the powder stock 9 in the container 8.

The powder feed unit 1 shown in FIG. 1 also comprises a load cell 27 that is operatively connected to the control unit 26. The person skilled in the art will appreciate that there are several positions were the load cell 27 can be arranged depending on the specific design of the powder feed unit 1. Possible alternative positions at which the load cell 27 can be arranged have been indicated by depicting the load cell 27 with dashed lines. The person skilled in the art will appreciate that also more than one load cell 27 can be used, e.g. two, three or four depending on the specific specifications of the powder feed unit 1.

The load cell 27 is configured and arranged to determine a mass of the container 8 and to provide a signal indicative for the determined mass of the container 8 to the control unit 26 that is configured to determine based on the signal received from the load cell 27 if the mass of the container 8 is equal to a predetermined minimum mass. The person skilled in the art will appreciate that in this way, it can be determined before starting of a welding or spraying process if there is still enough powder in the container 8. If the mass of the container 8 is above the predetermined minimum mass, the welding or spraying process can be started. If the mass of the container 8 is equal to or less than the predetermined minimum mass, then the control unit 26 can provide a signal or message that the container 8 needs to be replenished or changed. The load cell 27 can be of any suitable type such as a hydraulic load cell, a piezoelectric load cell, a pneumatic load cell, a capacitive load cell or a strain gauge load cell. The person skilled in the art will know how to configure and arrange the load cell 16 to obtain a reliable signal or message from the control unit 26.

Furthermore, the powder feed unit 1 shown in FIG. 1 comprises a flow rate controller 28 that is operatively connected to the control unit 26. The flow rate controller 28 is configured and arranged to control a flow rate, Q, of the carrier gas 6 flowing into the housing 4 via the inlet port 5 and out of the housing 4 via the outlet port 7 during operation of the powder feed unit 1. The person skilled in the art will appreciate that in this way the dosage of the powder particles 2 to an apparatus for performing laser welding or thermal processes can be controlled. In addition, it is noted that the flow rate controller 28 is configured and arranged to control the flow rate, Q, of the carrier gas 6 in a range $0.5 l/min \leq Q \leq 10 l/min$, preferably in a range $1.5 l/min \leq Q \leq 8.5 l/min$. In this way, the powder feed unit 1 shown in FIG. 1 allows application of low flow rates of carrier gas 6 which in particular is desirable to limit or prevent turbulence in the carrier gas flow.

In addition, although not shown in FIG. 1, the person skilled in the art will appreciate that in accordance with yet another embodiment of the powder feed unit of the present invention, it is possible to configure the rotatable supporting element 35 in such a way that it enables more than one container 8 to be positioned upon it. Alternatively, it would be possible to provide more than one rotatable supporting element 35 in the housing. On each one of the multiple rotatable supporting elements one or more containers could be positioned. Moreover, the powder feed unit in accordance with another exemplary embodiment could be provided with additional gas controllers for the purpose of controlling the backing gas inside the housing. The powder feed unit according to the invention can also be provided with at least one alarm in order to notify a user in case of an event that requires user intervention or in case of danger. Alternatively, the powder feed unit according to the invention can be provided with at least one bus system to enable data transfer between for example the control unit, the level sensor, the load cell, the flow rate controller, the additional gas controller and the at least one alarm.

Figure 2A:
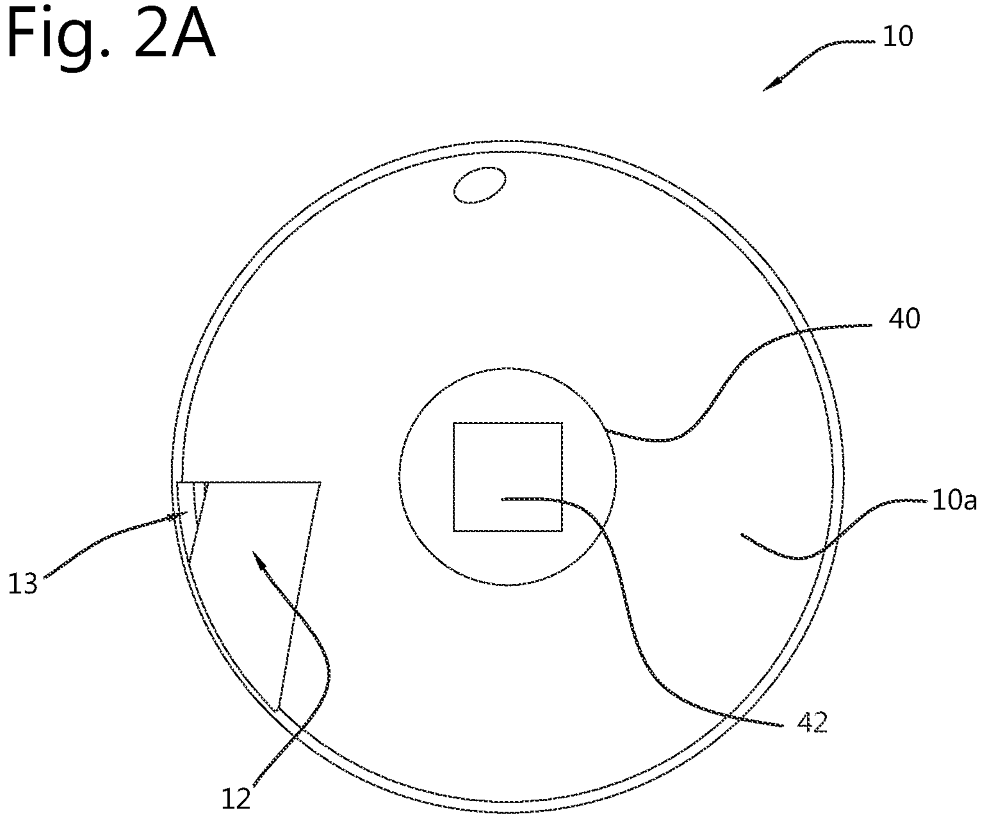
FIG. 2A shows a schematic top view of a first exemplary, non-limiting embodiment of a powder collection unit of the powder feed unit according to the invention.

FIG. 2A shows a schematic top view of a first exemplary, non-limiting embodiment of a powder collection unit 10 of the powder feed unit 1 according to the invention. The powder collection unit 10 in accordance with the first embodiment has a disc shape. The surface covering part 10*a* of the powder collection unit 10 is provided with a receiving member 40 for receiving the positioning element 30. The receiving member 40 is provided with a receiving space 42 having a cross-section that is configured to prevent rotation of the surface covering part 10*a* and the positioning element 30 with respect to each other once the positioning element 30 has been positioned in the receiving space 42. The receiving space 42 can be configured to have a cross-section that matches the cross-section of the positioning element 30 for snuggly enclosing the positioning element 30.

The surface covering part 10*a* shown in FIG. 1 is provided with a first passageway 12 that is configured to allow the carrier gas 6 to enter the powder collect-and-load cavity 13 of the powder collection unit 10. The first passageway 12 shown in FIG. 1 is configured and arranged to allow acceleration of the carrier gas 6 upon passing through the first passageway 12. By allowing acceleration of the carrier gas 6 not earlier than upon passing the first passageway 12 that is arranged in fluid communication with the powder collect-and-load cavity 13, it can be avoided that whirls in the carrier gas flow outside the powder collect-and-load cavity 13 can give rise to powder particles ending up on top of the powder collection unit 10. As a result, the performance of the powder feed unit 1 according to the invention can be improved compared to powder feed units known in the art.

Figure 2B:
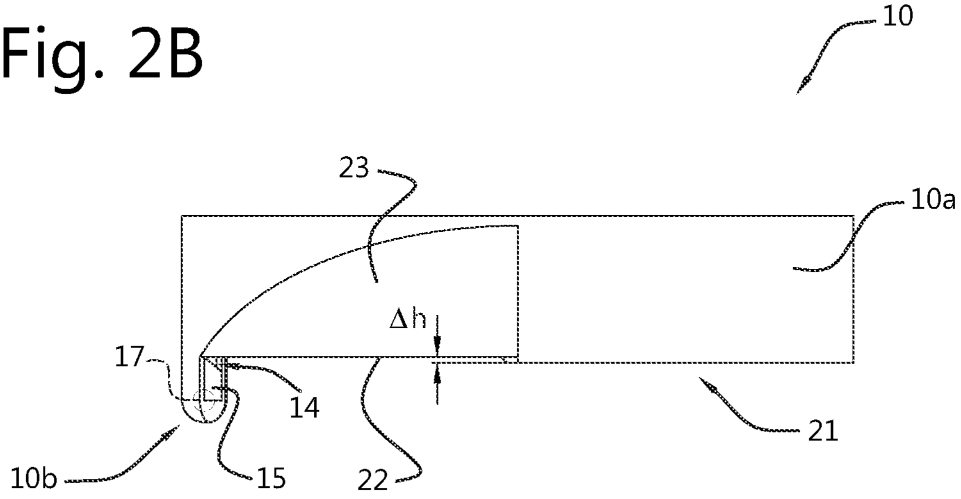
FIG. 2B shows a first schematic side view of the first exemplary, non-limiting embodiment of the powder collection unit.

FIG. 2B shows a first schematic side view of the first exemplary, non-limiting embodiment of the powder collection unit 10. The surface covering part 10*a* of the powder collection unit 10 comprises a first surface part 21 that in use of the powder feed unit 1 is arranged in contact with the first surface 9*a* of the powder stock 9 (see FIG. 1). In addition, the surface covering part 10*a* comprises a second surface part 22 that is arranged recessed with respect to the first surface part 21 and adjacent to the second passageway 14 in the powder collect-and-load part 10*b*. In use of the powder feed unit 1 the second surface part 14 is arranged facing towards the first surface 9*a* of the powder stock 9 (see FIG. 1). Furthermore, the surface covering part 10*a* of the powder collection unit 10 comprises a third surface part 23 that is arranged adjacent to both the second passageway 14 and the second surface part 22.

The first surface part 21 of the surface covering part 10*a* can remain in contact with the first surface 9*a* of the powder stock 9 because the powder collection unit 10 can move under the influence of gravity towards the bottom of the container 8 when the powder level of the powder stock 9 in the container 8 decreases. Due to the movement of the powder collection unit 10 and the container 8 with respect to each other, the first surface part 21 of the surface covering part 10*a* can at least partially level-off the powder particles 2 at the first surface 9*a* and provide at least a partially level first surface of the powder stock 9. While the first surface 9*a* of the powder stock 9 is being leveled-off, a bow wave 41 of powder particles 2 can be created at the third surface part 23 of the surface covering part 10*a*. This is further illustrated in FIG. 3.

The second surface part 22 of the surface covering part 10*a* of the powder collection unit 10 is arranged recessed with respect to the first surface part 21 in order to provide a volume that can accommodate powder particles 2 of the bow wave 41 of powder particles in such a way that the second passageway 14 in the powder collect-and-load part 10*b* of the powder collection unit 10 that is arranged adjacent to the second surface part 22 can remain fully immersed in the powder particles 2 that need to be supplied to an apparatus 3 for performing laser welding or thermal spraying processes that is connected with the powder feed unit 1 according to the invention. In this way, it can be assured that no interruptions during collection and loading of the powder particles 2 in the powder collect-and-load part 10*b* can occur. As a result, pulsations during the feeding or dosing of the powder particles 2 to an apparatus 3 for performing laser welding or thermal spraying processes can be reduced and ideally be prevented.

FIG. 2B shows that there is a height difference, Dh, between the second surface part 22 and the first surface part 21. The height different, Dh, is in a range 0.5 mm≤Dh≤2.5 mm. Preferably, Dh is in a range 0.7 mm≤Dh≤2.0 mm. The second surface part 22 should be able to provide a volume that can accommodate the powder particles 2 that are pushed towards the second surface part 22 and the second passageway 14 in the powder collect-and-load part 10*b* if the first surface 9*a* of the powder stock 9 is being levelled-off by the first surface part 21 of the surface covering part 10*a* of the powder collection unit 10. If the height difference, Dh, between the second surface part 22 and the first surface part 21 of the surface covering part 10*a* is smaller than 0.5 mm, it is possible that the above-mentioned volume cannot be sufficiently filled with powder particles 2 that during levelling-off of the first surface 9*a* of the powder stock 9 are pushed towards the second surface part 22 of the surface covering part 10*a*. In this case, the supply of powder particles 2 towards the second passageway 14 in the powder collect-and-load part 10*b* of the powder collection unit 10 can be interrupted. As mentioned above, this can cause pulsations in the collection and loading of the powder particles 2 and therefore result in a reduced performance of the powder collection unit 10 and a reduced performance of the powder feed unit 1 as a whole.

If the height difference, Dh, between the second surface part 22 and the first surface part 21 of the surface covering part 10*a* is larger than 2.5 mm, it is possible that the bow wave 41 of powder particles 2 cannot sufficiently be formed at the third surface part 23 of the surface covering part 10*a*. In this case, it is possible that it cannot be guaranteed that the second passageway 14 in the powder collect-and-load part 10*b* remains fully immersed in the powder particles 2. As a result, it cannot be guaranteed that the collection and loading of the powder particles 2 remains pulsation free and therefore the performance of the powder feed unit 1 as a whole can get compromised.

Figure 2C:
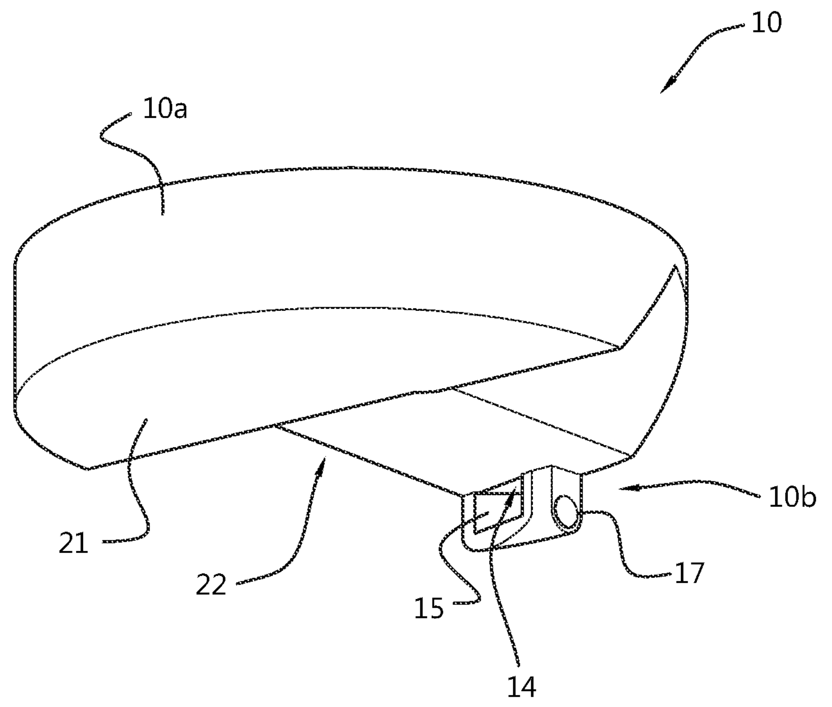
FIG. 2C shows a schematic isometric view of the first exemplary, non-limiting embodiment of the powder collection unit.

FIG. 2C shows a schematic isometric view of the first exemplary, non-limiting embodiment of the powder collection unit 10. The second passageway 14 in the powder collect-and-load part 10*b* of the powder collection unit 10 has a wedge-shape. The person skilled in the art will appreciate that the second passageway 14 can alternatively have a rectangular shape or a curved shape. Depending on specific requirements with respect to for example flow rates of the carrier gas 6 that is loaded with powder particles 2 from the powder stock 9, any one of the above-mentioned shapes of the second passageway 14 in the powder collect-and-load part 10*b* can be chosen as long as the second passageway 14 allows at least a majority of the above-mentioned powder particles 2 to freely fall into the powder collect-and-load cavity 13.

The wall portion 15 of the powder collect-and-load part 10*b* typically has a straight shape as shown in FIG. 2C. However, the person skilled in the art will appreciate that in accordance with an exemplary embodiment of the wall portion that is not shown in any one of the figures, the wall portion 15 can have a curved shape. In particular, depending on the specific requirements for the powder feed unit 1 to be used with an apparatus 3 for performing laser welding or thermal spraying processes, the wall portion 15 can have any curved shape that is suitable for smoothly and efficiently loading the carrier gas 6 with powder particles 2 from the powder stock 9 in the powder collect-and-load cavity 13 of the powder collection unit 10.

Figure 2D:
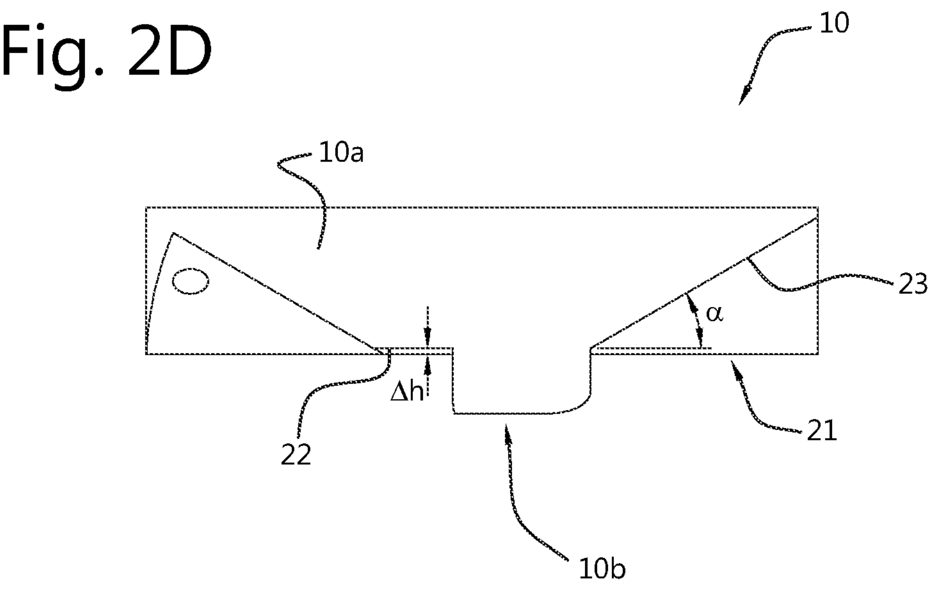
FIG. 2D shows a second schematic side view of the first exemplary, non-limiting embodiment of the powder collection unit.

FIG. 2D shows a second schematic side view of the first exemplary, non-limiting embodiment of the powder collection unit 10. The third surface part 23 of the surface covering part 10*a* is arranged at an angle α with respect to the second surface part 22. The angle α can be in a range $0°\leq\alpha\leq75°$. Preferably, the angle α is in a range $15°\leq\alpha\leq60°$ to support the bow wave 41 of particles (see FIG. 3). The above-mentioned height difference, Dh, between the second surface part 22 and the first surface part 21 of the surface covering part 10*a* is also shown in FIG. 2D.

Figure 3:
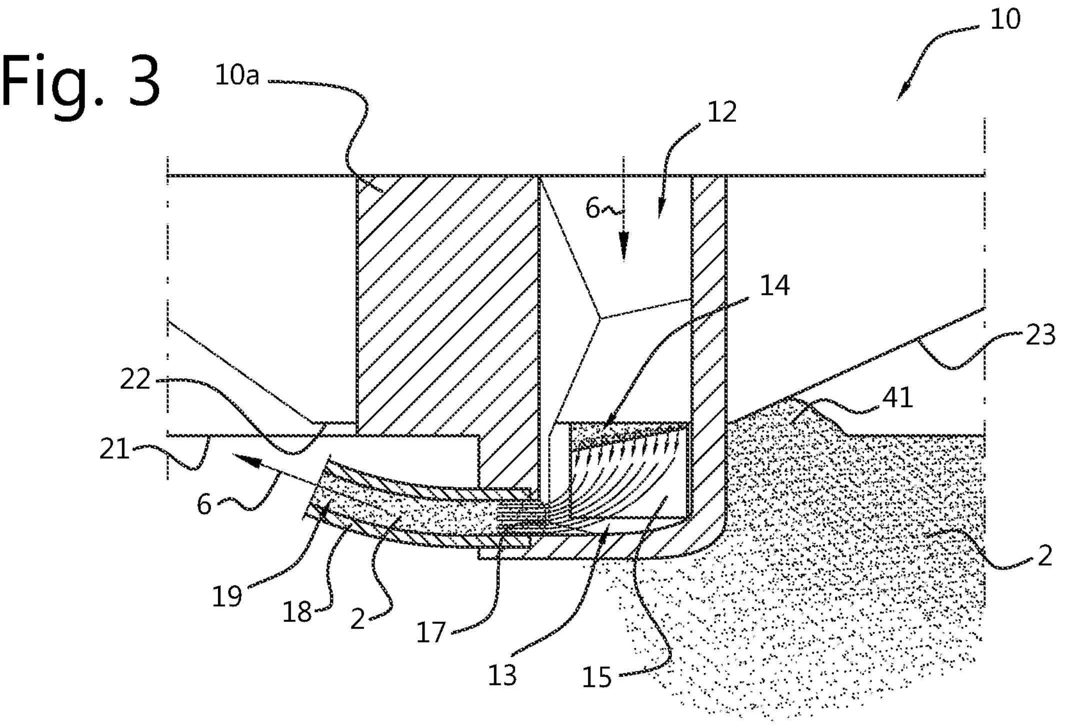
FIG. 3 shows a schematic cross-sectional view of the first exemplary, non-limiting embodiment of the powder collection unit at the location of the powder collect-and-load part of the powder collection unit.

FIG. 3 shows a schematic cross-sectional view of the first exemplary, non-limiting embodiment of the powder collection unit 10 at the location of the powder collect-and-load part 10*b* of the powder collection unit 10. FIG. 3 illustrates the bow wave 41 of powder particles at the third surface part 23 of the surface covering part 10*a* that keeps the second passageway 14 in the powder collect-and-load part 10*b* immersed in the powder particles 2, whereas the powder particles 2 that freely fall into the powder collect-and-load cavity 13 are loaded onto the carrier gas 6 that enters the powder collect-and-load cavity 13 via the first passageway 12 that is provided by the surface covering part 10*a*. FIG. 3 illustrates that any contact between the powder particles 2 and any interior surface of the powder collect-and-load cavity 13 can be avoided. As described above, this is beneficial for pulsation-free feeding and dosing of the powder particles 2 by the powder feed unit 1 according to the present invention.

FIG. 3 also illustrates that the carrier gas 6 that is loaded with the powder particles 2 can flow out of the powder collect-and-load cavity 13 via the third passageway 17 in the powder collect-and-load part 10*b* and the and via the guideway 19 that is provided by the tubular conveyor element 18, e.g. a hose, that is arranged in fluid communication with the third passageway 17.

Figure 4A:
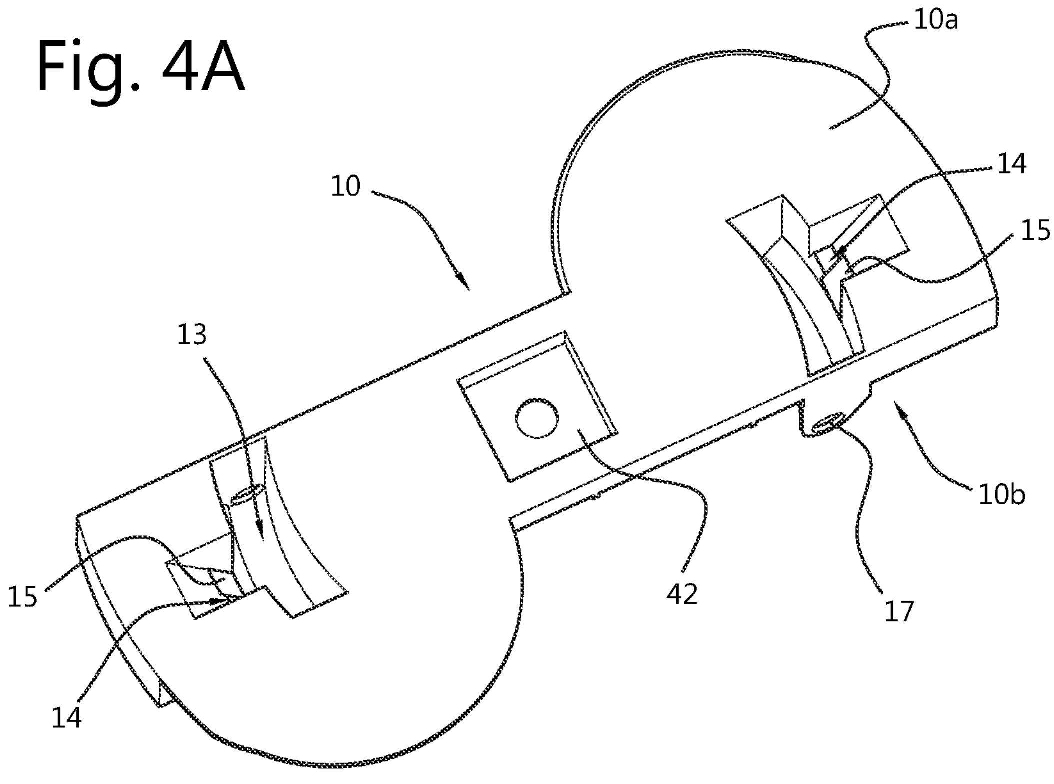
FIG. 4A shows a schematic isometric view of a second exemplary, non-limiting embodiment of a powder collection unit of the powder feed unit according to the invention.

FIG. 4A shows a schematic isometric view of a second exemplary, non-limiting embodiment of a powder collection unit 10 of the powder feed unit 1 according to the invention. In accordance with the embodiment shown in FIGS. 4A and 4B, the surface covering part 10*a* is associated with two powder collect-and-load parts 10*b*. As mentioned above, the surface covering part 10*a* can be associated with any suitable number of powder collect-and-load parts, e.g. 2, 3 or 4, that can be arranged with respect to each other at any suitable location, i.e. at any location where the multiple powder collect-and-load parts do not negatively influence each other.

Figure 4B:
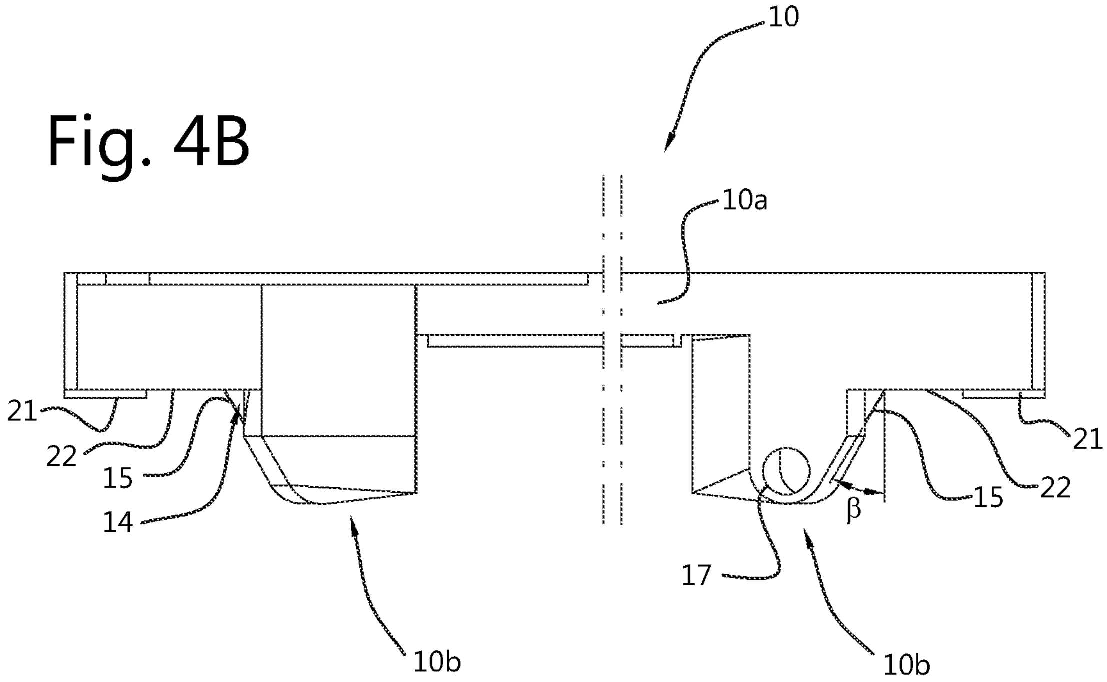
FIG. 4B shows a side view of the second exemplary, non-limiting embodiment of a powder collection unit of the powder feed unit.

FIG. 4B shows a side view of the second exemplary, non-limiting embodiment of a powder collection unit 10 of the powder feed unit 1 shown in FIG. 4A. In accordance with the embodiment shown in FIGS. 4A and 4B, the wall portion 15 has a flat shape and is arranged at an angle β with respect to a normal vector of the second surface part 22 of the surface covering part 10*a* of the powder collection unit 10. The angle β can be in a range $-45°\leq\beta\leq+30°$. Preferably, the angle β can be in a range $-30°\leq\beta\leq+15°$, and most preferably the angle β is equal to 0°.

In the event that the flat wall portion 15 is arranged at an angle β that is in a range $-45°\leq\beta\leq0°$ with respect to the second surface part 22 of the surface covering part 10*a*, the majority of particles 2 from the powder stock 9 (not shown) can freely fall into the powder collect-and-load cavity 13 (see FIG. 4A) if the powder collection unit 10 and the container 8 are rotated with respect to each other by the actuator 11 (see FIG. 1). For an angle β that is for example in a range $-75°\leq\beta\leq-45°$ the powder collect-and-load cavity 13 becomes unnecessarily large. Therefore, in order to achieve a powder collect-and-load part 10*b* with minimum dimensions that still allows the majority of particles 2 from the powder stock 9 to freely fall into the powder collect-and-load cavity 13, an angle β that is equal to 0° is preferred. The wall portion 15 in accordance with the first exemplary, non-limiting embodiment of the powder collection unit 10 is arranged at an angle β that is equal to 0° (see FIGS. 2B, 2C and 3).

If the angle β is in a range $0°<\beta\leq+30°$, the wall portion 15 provides a ramp or a slide for the powder particles 2 that enter through the second passageway 14 in the powder collect-and-load part 10*b* (see FIGS. 4A and 4B). Although in this case the majority of particles 2 from the powder stock 9 cannot freely fall into the powder collect-and-load cavity 13, the loading of the carrier gas 6 with the powder particles 2 can still be done without excessive interaction between the powder particles 2, the wall portion 15 and/or other interior walls of the powder collect-and-load cavity 13. Although it may no longer be possible to achieve pulsation-free feeding of powder particles 2, pulsations in the feeding of powder particles 2 by the powder feed unit 1 according to the present invention can be reduced compared to powder feed units known in the art. For an angle $\beta>+30°$, the interactions between the powder particles 2, the wall portion 15 and/or other interior walls of the powder collect-and-load cavity 13 are too large to achieve even reduced pulsations in the feeding of powder particles 2 by the powder feed unit 1 according to the present invention.

Figure 5A:
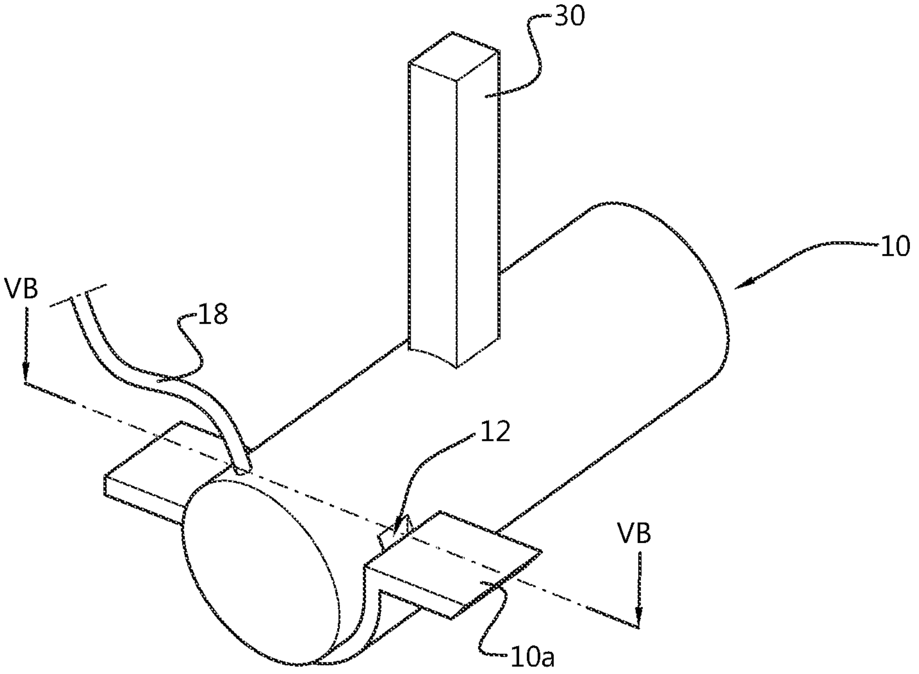
FIG. 5A shows a schematic isometric view of a third exemplary, non-limiting embodiment of the powder collection unit of the powder feed unit according to the invention.

FIG. 5A shows a schematic isometric view of a third exemplary, non-limiting embodiment of the powder collection unit 10 of the powder feed unit 1 according to the invention. The third embodiment of the powder collection unit 10 can be construed as a front-loading powder collection unit whereas the first and second exemplary, non-limiting embodiments of the powder collection unit 10 can be construed as a side-loading powder collection unit. The powder collection unit 10 in accordance with the third embodiment has a rod or stick or bar shape. FIG. 5A shows that the powder collection unit 10 is provided with a tubular conveyor element 18 that is configured and arranged to convey pressurized carrier gas 6 that is loaded with powder particles 2 during operation of the powder feed unit 1 according to the invention. The pressurized carrier gas 6 can enter the powder collection unit 10 via the first passageway 12.

Figure 5B:
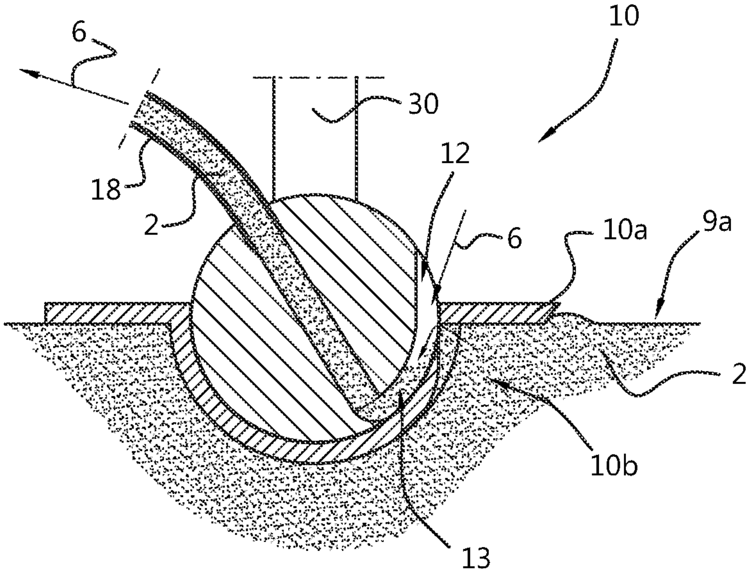
FIG. 5B shows a schematic cross-sectional side view of the third exemplary, non-limiting embodiment of the powder collection unit along line VB-VB shown in FIG. 5A.
Figure 5C:
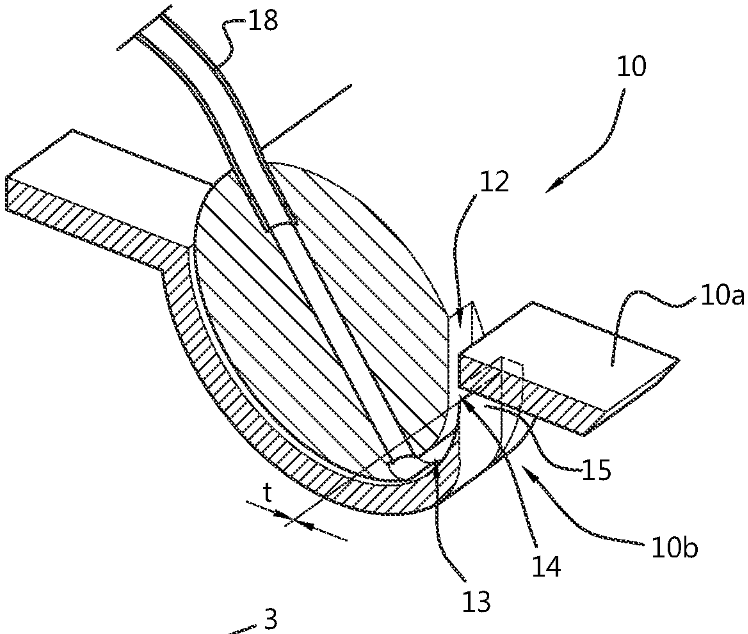
FIG. 5C shows a schematic cross-sectional isometric view of the third exemplary, non-limiting embodiment of the powder collection unit along line VB-VB shown in FIG. 5A.

FIG. 5B shows a schematic cross-sectional side view of the third exemplary, non-limiting embodiment of the powder collection unit 10 along line VB-VB shown in FIG. 5A. In FIG. 5B, the powder collection unit 10 is positioned in contact with the powder particles 2 of the powder stock 9. The surface covering part 10*a* is arranged to at least partially level-off the first surface 9*a* of the powder stock 9 if the powder feed unit 1 is operated. In that case, the powder particles 2 can freely fall into the powder collect-and-load cavity 13 via the second passageway 14 in the powder collect-and-load part 10*b*. The second passageway 14 can more clearly be seen in FIG. 5C that shows a schematic cross-sectional isometric view of the third exemplary, non-limiting embodiment of the powder collection unit 10 along line VB-VB shown in FIG. 5A. For the sake of clarity no powder particles are shown in FIG. 5C. The powder particles 2 that freely fall into the powder collect-and-load cavity 13 are loaded onto the pressurized carrier gas 6 that can enter the powder collect-and-load cavity 13 via the first passageway 12. The pressurized carrier gas 6 that is loaded with the powder particles 2 can exit the powder collect-and-load cavity 13 via the tubular conveyor element 18.

FIG. 5C shows that the wall portion 15 at the second passageway 14 has a thickness, t. The thickness, t, can have a value in a range 0.05 mm≤t≤0.5 mm. Preferably, the thickness, t, can be in a range 0.1 mm≤t≤0.4 mm. In this way, friction between the powder particles 2 and the wall portion 15 at the second passageway 14 can be reduced and ideally be minimized when the powder particles 2 enter the powder collect-and-load cavity 13 via the second passageway 14. This is beneficial for achieving pulsation-free feeding of powder particles 2 by the powder feed unit 1 according to the present invention to an apparatus 3 for performing laser welding or thermal spraying processes.

FIG. 6 shows a schematic layout of an exemplary, non-limiting embodiment of an apparatus 3 for performing laser welding or thermal spraying processes according to the invention that comprises a powder feed unit 1 according to the invention. The powder feed unit 1 is connected to the apparatus 3 via the tubular conveyor element 18 through which the pressurized carrier gas 6 that is loaded with the powder particles 2 is conveyed to the apparatus 3. In accordance with the exemplary, non-limiting embodiment of the apparatus 3 shown in FIG. 6, the housing 4 of the powder feed unit 1 is provided with a wall mounting element 29. This improves user friendliness of the powder feed unit 1 as it can for example be mounted on a wall close to the apparatus 3 for welding or spraying processes. The person skilled in the art will appreciate that suitable wall mounting elements include for example latches, clamps, catches, locks, hooks, pins, nails, screws, bolts and nuts, chains and any combination thereof.

The present invention can be summarized as relating to a powder feed unit 1 comprising a powder collection unit 10 that comprises a surface covering part 10*a* and a powder collect-and-load part 10*b* that allow a carrier gas 6 to enter a powder collect-and-load cavity 13 of the powder collect-and-load part via a first passageway 12, and powder particles to freely fall into said cavity via a second passageway 14. Upon entering said cavity, the powder particles are loaded onto the carrier gas thereby reducing and ideally avoiding contact between the powder particles and interior surfaces of said cavity. The carrier gas that is loaded with the powder particles can exit said cavity via a third passageway 17 that is fluidly connected with a tubular conveyor element 18. The invention also relates to an apparatus 3 for performing laser welding processes or thermal spraying processes that comprises the powder feed unit according to the invention.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word “comprising” does not exclude other steps or elements, and the indefinite article “a” or “an” does not exclude a plurality. The mere fact that certain measures are recited in mutually different dependent claims does not indicate that a combination of these measures cannot be used to advantage. Any reference numerals in the claims should not be construed as limiting the scope of the present invention.

REFERENCE NUMERALS

1 powder feed unit
2 powder particles
3 apparatus for performing laser welding processes or thermal spraying processes
4 housing of the powder feed unit
inlet port of the housing
6 carrier gas
7 outlet port of the housing
8 container for containing powder stock
9 powder stock
9*a* first surface of the powder stock
powder collection unit
10*a* surface covering part of the powder collection unit
10*b* powder collect-and-load part of the powder collection unit
11 actuator
12 first passageway
13 powder collect-and-load cavity of the powder collect-and-load part
14 second passageway in the powder collect-and-load part
wall portion of the powder collect-and-load part
17 third passageway in the powder collect-and-load part
18 tubular conveyor element
19 guideway for carrier gas loaded with powder particles
21 first surface part of the surface covering part

22 second surface part of the surface covering part
23 third surface part of the surface covering part
24 level sensor
25 powder level
26 control unit
27 load cell
28 flow rate controller
29 wall mounting element
30 positioning element
31 base part of the housing
32 hood of the housing
33 inner space of the housing
**34*a*** sealing arrangement
**34*b*** sealing arrangement
**34*c*** sealing arrangement
**34*d*** sealing arrangement
35 rotatable supporting element
36 motor
37 transmission arrangement
38 sliding tube
40 receiving member for the positioning element
41 bow wave of powder particles
42 receiving space

What is claimed is:

1. A powder feed unit for feeding powder particles to an apparatus for performing laser welding processes or thermal spraying processes, the powder feed unit comprising:

- a housing that is provided with an inlet port that is configured and arranged to allow influx of a carrier gas into the housing and an outlet port that is configured and arranged to allow outflux of the carrier gas out of the housing, the housing being configured to contain the carrier gas in use of the powder feed unit at a pressure that is higher than a pressure of an environment in which the housing is positioned;
- a container that is arranged within the housing, the container comprising a powder stock that comprises at least one of metallic powder particles and ceramic powder particles;
- a powder collection unit and an actuator that is configured and arranged to rotate the powder collection unit and the container with respect to each other, the powder collection unit comprising:
  - a surface covering part that in use of the powder feed unit is arranged in contact with a first surface of the powder stock, the surface covering part being configured and arranged to at least partially level-off the first surface and to provide a first passageway for the carrier gas to enter the powder collection unit; and
  - a powder collect-and-load part that in use of the powder feed unit is arranged at least partially below the first surface of the powder stock, the powder collect-and-load part being provided with:
    - a powder collect-and-load cavity that is arranged in fluid communication with the first passageway for allowing the carrier gas to enter the powder collect-and-load cavity;
    - a second passageway that is configured and arranged to allow powder particles of the powder stock to enter the powder collect-and-load cavity upon activation of the actuator;
    - a wall portion that is configured and arranged to allow at least a portion of the powder particles of the powder stock upon passing through the second passageway to freely fall into the powder collect-and-load cavity and to be loaded onto the carrier gas;
    - a third passageway that is configured and arranged to allow the carrier gas that is loaded with at least said portion of the powder particles to exit the powder collect-and-load cavity; and
- a tubular conveyor element that is arranged in fluid communication with the third passageway in the powder collect-and-load part of the powder collection unit and the outlet port of the housing, the tubular conveyor element providing a guideway that is configured and arranged to convey the carrier gas that is loaded with at least said portion of the powder particles from the powder collect-and-load cavity outside the housing via the outlet port.

2. The powder feed unit according to claim 1, wherein the second passageway in the powder collect-and-load part of the powder collection unit has one of a wedge-shape, a rectangular shape, and a curved shape.

3. The powder feed unit according to claim 1, wherein the wall portion has a flat shape and is arranged at an angle $\beta$ with respect to a normal vector of the second surface part of the surface covering part of the powder collection unit, the angle $\beta$ being in a range $-45° \leq \beta \leq +30°$, preferably the angle $\beta$ is in a range $-30° \leq \beta \leq +15°$, most preferably the angle $\beta$ is equal to 0°.

4. The powder feed unit according to claim 1, wherein the wall portion has a curved shape.

5. The powder feed unit according to claim 1, wherein the wall portion at the second passageway has a thickness, t, that is in a range $0.05\ mm \leq t \leq 0.5\ mm$, preferably the thickness, t, is in a range $0.1\ mm \leq t \leq 0.4\ mm$.

6. The powder feed unit according to claim 1, wherein the actuator is configured and arranged to rotate at a predetermined rotation speed the container with respect to the powder collection unit or the powder collection unit with respect to the container.

7. The powder feed unit according to claim 1, wherein the actuator is a rotatable supporting element that is arranged inside the housing to support and rotate the container with respect to the powder collection unit at a predetermined rotation speed.

8. The powder feed unit according to claim 1, wherein the powder feed unit comprises a level sensor that is configured and arranged to determine a powder level of the powder stock in the container and to provide a signal indicative for the determined powder level of the powder stock in the container to a control unit that is configured to determine based on the signal received from the level sensor whether the powder level of the powder stock in the container is equal to a predetermined minimum powder level.

9. The powder feed unit according to claim 1, wherein the powder feed unit comprises a load cell that is configured and arranged to determine a mass of the container and to provide a signal indicative for the determined mass of the container to a control unit that is configured to determine based on the signal received from the load cell whether the mass of the container is equal to a predetermined minimum mass.

10. An apparatus for performing laser welding processes or thermal spraying processes involving at least one of metallic powder and ceramic powder, wherein the apparatus comprises the powder feed unit according to claim 1.

11. The powder feed unit according to claim 1, wherein the surface covering part of the powder collection unit comprises:

- a first surface part that in use of the powder feed unit is arranged in contact with the first surface of the powder stock;

a second surface part that is arranged recessed with respect to the first surface part and adjacent to the second passageway in the powder collect-and-load part, and wherein in use of the powder feed unit the second surface part is arranged facing towards the first surface of the powder stock; and a third surface part that is arranged adjacent to both the second passageway and the second surface part, the third surface part being arranged at an angle $\alpha$ with respect to the second surface part, the angle $\alpha$ being in a range $0° \leq \alpha \leq 75°$, preferably the angle $\alpha$ is in a range $15° \leq \alpha \leq 60°$.

12. The powder feed unit according to claim 11, wherein a height difference, Dh, between the second surface part and the first surface part is in a range 0.5 mm≤Dh≤2.5 mm, preferably Dh is in a range 0.7 mm≤Dh≤2.0 mm.

13. The powder feed unit according to claim 1, wherein the powder feed unit comprises a flow rate controller that is configured and arranged to control a flow rate, Q, of the carrier gas flowing into the housing via the inlet port and out of the housing via the outlet port.

14. The powder feed unit according to claim 13, wherein the flow rate controller is configured and arranged to control the flow rate, Q, of the carrier gas in a range 0.5l/min≤Q≤10l/min, preferably in a range 1.5l/min≤Q≤8.5l/min.

15. The powder feed unit according to claim 1, wherein the first passageway is configured and arranged to allow acceleration of the carrier gas upon passing of the carrier gas through the first passageway.

16. The powder feed unit according to claim 15, wherein the surface covering part of the powder collection unit comprises:

a first surface part that in use of the powder feed unit is arranged in contact with the first surface of the powder stock;

a second surface part that is arranged recessed with respect to the first surface part and adjacent to the second passageway in the powder collect-and-load part, and wherein in use of the powder feed unit the second surface part is arranged facing towards the first surface of the powder stock; and a third surface part that is arranged adjacent to both the second passageway and the second surface part, the third surface part being arranged at an angle $\alpha$ with respect to the second surface part, the angle $\alpha$ being in a range $0° \leq \alpha \leq 75°$, preferably the angle $\alpha$ is in a range $15° \leq \alpha \leq 60°$, wherein a height difference, Dh, between the second surface part and the first surface part is in a range 0.5 mm≤Dh≤2.5 mm, preferably Dh is in a range 0.7 mm≤Dh≤ 2.0 mm, and wherein the second passageway in the powder collect-and-load part of the powder collection unit has one of a wedge-shape, a rectangular shape, and a curved shape.

17. The powder feed unit according to claim 16, wherein the wall portion has a flat shape and is arranged at an angle $\beta$ with respect to a normal vector of the second surface part of the surface covering part of the powder collection unit, the angle $\beta$ being in a range $-45° \leq \beta \leq +30°$, preferably the angle $\beta$ is in a range $-30° \leq \beta \leq +15°$, most preferably the angle $\beta$ is equal to 0°, or wherein the wall portion has a curved shape.

18. The powder feed unit according to claim 17, wherein the wall portion at the second passageway has a thickness, t, that is in a range 0.05 mm≤t≤0.5 mm, preferably the thickness, t, is in a range 0.1 mm≤t≤0.4 mm, wherein the actuator is configured and arranged to rotate at a predetermined rotation speed the container with respect to the powder collection unit or the powder collection unit with respect to the container, and wherein the actuator is a rotatable supporting element that is arranged inside the housing to support and rotate the container with respect to the powder collection unit at a predetermined rotation speed.

19. The powder feed unit according to claim 18, wherein the powder feed unit comprises a level sensor that is configured and arranged to determine a powder level of the powder stock in the container and to provide a signal indicative for the determined powder level of the powder stock in the container to a control unit that is configured to determine based on the signal received from the level sensor whether the powder level of the powder stock in the container is equal to a predetermined minimum powder level, or wherein the actuator is a rotatable supporting element that is arranged inside the housing to support and rotate the container with respect to the powder collection unit at a predetermined rotation speed.

20. The powder feed unit according to claim 19, wherein the powder feed unit comprises a load cell that is configured and arranged to determine a mass of the container and to provide a signal indicative for the determined mass of the container to a control unit that is configured to determine based on the signal received from the load cell whether the mass of the container is equal to a predetermined minimum mass, wherein the powder feed unit comprises a flow rate controller that is configured and arranged to control a flow rate, Q, of the carrier gas flowing into the housing via the inlet port and out of the housing via the outlet port, and wherein the flow rate controller is configured and arranged to control the flow rate, Q, of the carrier gas in a range 0.5l/min≤Q≤10l/min, preferably in a range 1.5l/min≤Q≤8.5l/min.

* * * * *